(12) United States Patent
Dondi

(10) Patent No.: US 6,617,712 B1
(45) Date of Patent: Sep. 9, 2003

(54) LINEAR POSITION TRANSDUCER WITH PRIMARY AND SECONDARY WINDINGS AND A MOVABLE INDUCTION COUPLING ELEMENT

(75) Inventor: Valerio Dondi, Castel Maggiore (IT)

(73) Assignee: Marposs, S.p.A., Bentivoglio (IT)

( * ) Notice: Subject to any disclaimer, the term of this patent is extended or adjusted under 35 U.S.C. 154(b) by 0 days.

(21) Appl. No.: 09/830,303

(22) PCT Filed: Oct. 20, 1999

(86) PCT No.: PCT/EP99/07957

§ 371 (c)(1), (2), (4) Date: Apr. 25, 2001

(87) PCT Pub. No.: WO00/25092

PCT Pub. Date: May 4, 2000

(30) Foreign Application Priority Data

Oct. 26, 1998 (IT) ......................................... BO98A0606

(51) Int. Cl.[7] ............................................. H02K 41/00
(52) U.S. Cl. ............................................ 310/12; 310/10
(58) Field of Search ............................... 310/10, 12, 13; 318/687, 135

(56) References Cited

U.S. PATENT DOCUMENTS

| | | | | |
|---|---|---|---|---|
| 3,235,790 A | * | 2/1966 | Collins | 323/51 |
| 3,684,961 A | * | 8/1972 | Muir | 324/207.18 |
| 3,729,663 A | * | 4/1973 | Stevenson et al. | 318/135 |
| 3,740,628 A | * | 6/1973 | Inagaki et al. | 318/135 |
| 3,858,522 A | * | 1/1975 | Maki | 104/148 LM |
| 4,083,237 A | * | 4/1978 | Levesque | 73/141 R |
| 4,100,480 A | * | 7/1978 | Lytle et al. | 323/51 |
| 4,140,998 A | * | 2/1979 | Bettle | 340/870.36 |
| 4,251,762 A | * | 2/1981 | Williams | 318/653 |
| 4,323,884 A | * | 4/1982 | Durandeau et al. | 341/151 |
| 4,358,762 A | | 11/1982 | Wolf et al. | 340/870.35 |
| 4,514,689 A | * | 4/1985 | Gerard | 324/207.18 |
| 4,556,886 A | * | 12/1985 | Shimizu et al. | 340/870.32 |
| 4,644,355 A | * | 2/1987 | Russell | 340/870.36 |
| 4,678,991 A | * | 7/1987 | Schmidt | 324/207.18 |
| 4,694,246 A | * | 9/1987 | Avisse | 324/207.18 |
| 4,882,522 A | * | 11/1989 | Brown | 315/119 |
| 4,904,921 A | * | 2/1990 | DeVito et al. | 323/264 |
| 4,908,533 A | * | 3/1990 | Karita et al. | 310/12 |
| 4,982,156 A | * | 1/1991 | Lewis et al. | 324/207.18 |
| 5,121,042 A | * | 6/1992 | Ako | 318/657 |
| 5,280,239 A | * | 1/1994 | Klimovitsky et al. | 324/207.26 |
| 5,841,274 A | * | 11/1998 | Masreliez et al. | 324/207.17 |
| 6,504,691 B1 | * | 1/2003 | Matsui et al. | 361/38 |
| 6,518,682 B2 | * | 2/2003 | Weaver et al. | 310/12 |

FOREIGN PATENT DOCUMENTS

| | | |
|---|---|---|
| FR | 2466620 | 4/1981 |
| GB | 1433402 | 4/1976 |

* cited by examiner

*Primary Examiner*—Nestor Ramirez
*Assistant Examiner*—Pedro J. Cuevas
(74) *Attorney, Agent, or Firm*—Dickstein Shapiro Morin & Oshinsky LLP

(57) ABSTRACT

A linear inductive transducer (T) includes a pair of primary windings (1, 3), fed by means of a power supply unit (C; 11, 13), a pair of secondary windings (2, 4) and a magnetic core (8), movable with respect to the windings. The secondary windings are electrically connected at an intermediate connection point between the primaries, and the transducer provides an electric output signal (Vo) as the sum of two components (Vs, Vs'), both variable as the mutual position between the windings and the core changes, and that depend on variations of the inductance of the primary windings and mutual inductance between the primaries and the secondaries, respectively. According to a specific configuration, it is also possible, starting from a single structure and by varying, in substance, the power supply and the output connections, to attain a transducer (T') with different functional characteristics (for example, of the differential transformer type, half bridge type, or of another type).

14 Claims, 5 Drawing Sheets

LINEAR POSITION TRANSDUCER WITH PRIMARY AND SECONDARY WINDINGS AND A MOVABLE INDUCTION COUPLING ELEMENT

TECHNICAL FIELD

The present invention relates to a linear inductive transducer including electric windings with a primary winding and a pair of secondary windings, a magnetic core, for performing linear displacements relative to the electric windings, a pair of input terminals electrically connected to the primary winding and adapted for being electrically connected to a power supply unit, at least an output terminal electrically connected to the electric windings, the transducer being adapted for providing, through the output terminal, an electric signal indicative of the mutual position between the electric windings and the magnetic core.

The invention also relates to a linear inductive transducer including electric windings with a primary winding and a pair of secondary windings, a magnetic core, for performing linear displacements relative to the electric windings, a pair of input terminals electrically connected to the primary winding and adapted for being electrically connected to a power supply unit, and output terminals electrically connected to the electric windings, the transducer being adapted for providing, through at least one of the output terminals, an electric signal indicative of the mutual position between the electric windings and the magnetic core.

BACKGROUND ART

Transducers with these characteristics, in particular of the Linear Variable Differential Transformer (LVDT) type have been known for a long time and utilized, among other things, in many measuring apparatuses for providing electric signals indicative of the mutual position between mechanical parts. These transducers include a primary winding and a pair of secondary windings connected together in series opposition. The windings are wound on a substantially cylindrical bobbin at the interior of which a ferromagnetic core displaces along an axial direction. The primary winding is energized with a sinusoidal voltage and generates, at the ends of the secondary windings, induced voltages that vary as the axial position of the core changes. More specifically, the voltages induced in the secondary windings are equal and oppositely phased when the core is at an axially centered position. Thus, the total voltage at the free terminals of the secondary windings is null at said axially centered position, while its amplitude varies as the axial position of the core changes, and its phase changes in response to the sense of the axial displacement with respect to the centered position.

In U.S. Pat. No. 4,386,467 there is disclosed a possible application of an LVDT in a comparator for checking a hole of a mechanical piece, in which the core and the transducer windings are respectively coupled to two mutually movable arms that carry feelers for touching diametrically opposite points of the hole.

Other types of inductive transducers are known as Half Bridge Transducers or HBT. These transducers include a pair of series connected windings, wound on a bobbin and energized with a sinusoidal voltage at the free ends thereof, and a ferromagnetic core axially movable within the bobbin. The output voltage is drawn at an intermediate point between the windings and its amplitude varies as the axial position of the core changes. The HBTs are broadly utilized in measuring devices, especially in simple devices like axial, or cartridge, heads, in consideration of the attributes of simplicity and inexpensiveness. Furthermore, unlike the LVDT transducers, the half bridge transducers have low output impedance values (e.g., 300 ohm as compared to 2000 ohm that represent a typical value for an LVDT), thus the negative effects due to increased load impedance caused by the cable for the connection to the conditioning units are negligible. In fact, different cable lengths determine different load impedance values at the output of the transducer, and said load impedance in turn determines a variation in the amplitude of the output signal that increases the more the transducer output impedance is higher.

In a half bridge transducer the output impedance is relatively low since it is determined by the parallel of the impedances of the two windings, while it is definitely higher in a differential transformer transducer, where it is determined by the sum of the impedances of the two series connected secondary windings.

Another advantageous feature of the HBT in comparison with the LVDT, particularly in multiple applications in which the signals sent by a plurality of transducers have to be managed, is the possibility of utilizing—between each of the HBT and the conditioning unit—one electric connection wire less (three, as compared to four that are necessary for the differential transformer transducers) thereby simplifying the application.

A drawback of the HBTs is the poor sensitivity, i.e. the low ratio between the detected output signal variation and the associated core displacement. In a half bridge transducer, the sensitivity mainly depends on the geometric characteristics, more specifically on the ratio existing between the dimensions of the windings and those of the core, both generally imposed by the dimensions of the measuring device including the transducer. Hence, it is impossible to independently define the sensitivity and modify it for specific applications, for example in an application of a comparator as the one described in the formerly mentioned patent U.S. Pat. No. 4,386,467. In fact, in this specific case, as there is an "arms ratio" (i.e., the ratio between the amount of displacement of the feelers and the amount of the associated mutual displacement between the transducer's core and windings) that is known and generally differs from one, it can be advantageous to define the transducer sensitivity in order to take into account this known ratio, in this way simplifying the processings performed by the conditioning circuit.

DISCLOSURE OF INVENTION

An object of the present invention is to provide a linear inductive transducer that overcomes the disadvantages of the known transducers and, more specifically, enables to define its sensitivity regardless of the geometric characteristics, and none the less ensures a lower output impedance value and a lesser number of external electric connections with respect to the known differential transformer transducers.

This and other objects and advantages are achieved by a transducer according to claim 1.

A further object of the invention is to provide a linear inductive transducer that can present the functional charactersitcs of a differential transformer transducer, or a half bridge transducer, or a transducer of another type, by carrying out simple and rapid modifications.

This further object is achieved by a transducer according to claim 8.

BRIEF DESCRIPTION OF THE DRAWINGS

The invention is now described in more detail with reference to the enclosed sheets of drawings, given by way of non limiting example, wherein.

Figure 1:
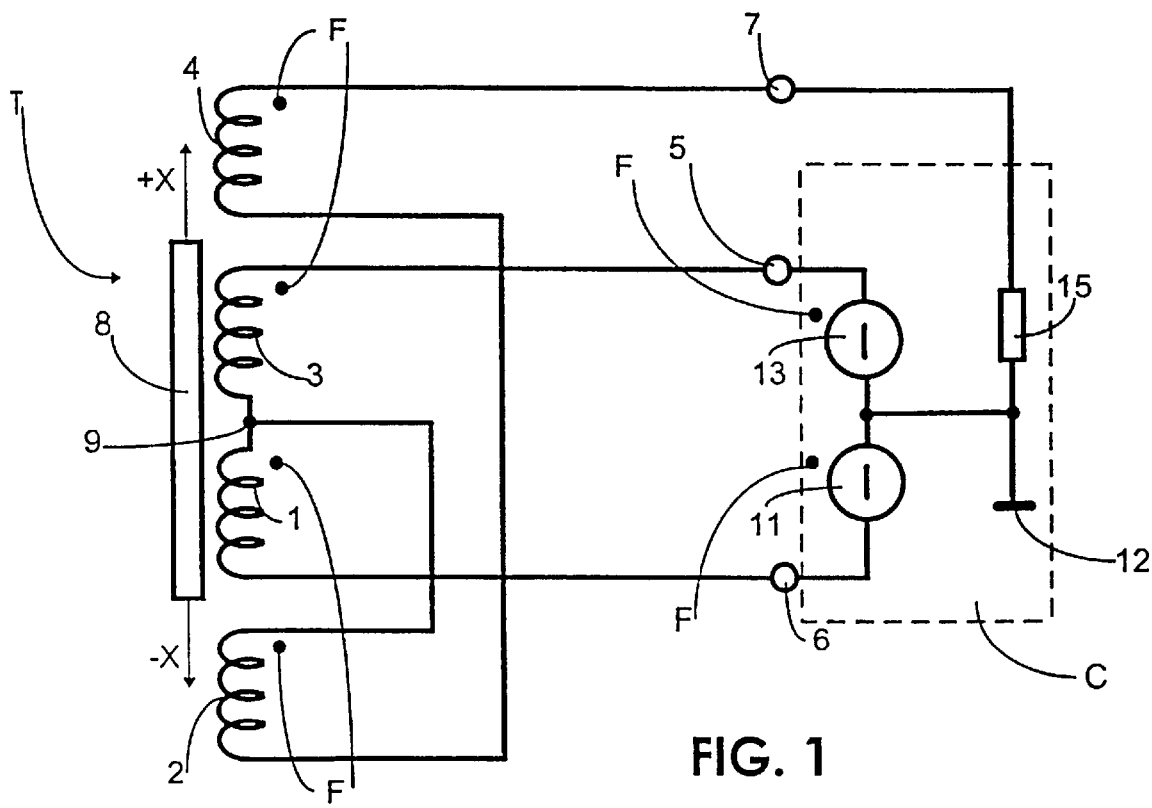
FIG. 1 is a circuit diagram of an inductive transducer according to a preferred embodiment of the invention.

The circuit of FIG. 1 schematically shows an inductive transducer T including first and second primary windings 1 and 3, first and second secondary windings 2 and 4, two input terminals 5 and 6 and an output terminal 7. A magnetic core 8 can translate, with respect to windings 1–4, in the ±X direction.

A conditioning, or power supply and processing, unit C includes two sinusoidal voltage generators 11 and 13, connected to ground (identified by reference number 12) and in phase opposition to input terminals 5 and 6, respectively, while signal processing means, connected to output terminal 7, are schematically shown with a load impedance 15.

A connection point 9 intermediate between primary windings 1 and 3 (that have the same number of turns N1) is connected to an end of one (2) of the secondary windings 2 and 4, the latter being connected to each other in phase oppostion and having the same number of turns N2.

The dots F in the figure stand to indicate the phases associated with the voltages across the different windings 1–4 and the voltage generators 11 and 13.

In an application in a comparator as the one shown in U.S. Pat. No. 4,386,467, core 8 and windings 1–4 are connected to the two movable arms carrying the feelers, respectively. The operation of the circuit shown in FIG. 1 is as follows.

The primary windings 1 and 3 are energized with sinusoidal power supply voltages $Va_{11}$ and $Va_{13}$, that are identical and in phase oppostion, supplied by generators 11 and 13.

The voltage Vo at output terminal 7, or measuring signal, is equal to the sum of two components: voltage Vs, present—with respect to ground—at intermediate point 9 between primary windings 1 and 3, and voltage Vs' induced in the overall secondary windings 2 and 4:

$$Vo = Vs + Vs' \quad (1)$$

More particularly, the value of Vs, or unbalance voltage of the primary windings, is defined by $$Vs = (V1 - V3)/2 \quad (2)$$

where V1 and V3 indicate the voltages, or potential drops, across the primary windings 1 and 3, respectively, while the value of Vs', or unbalance voltage of the secondary windings, is defined by $$Vs' = V4 - V2 \quad (3)$$

where V4 and V2 indicate the voltages induced in the secondary windings 4 and 2, respectively.

When core 8 is at the central, symmetric position with respect to both the primary windings 1 and 3 and the secondary windings 2 and 4 shown in FIG. 1, both the components of the measuring signal Vo become null because the voltages at the ends of each of the primary windings 1 and 3 and each of the secondary windings 2 and 4, respectively, have identical value:

$$V1 = V3 \quad (4)$$

$$V2 = V4 \quad (5)$$

Thus, in these conditions Vo=0.

The displacement of core 8, in response, for example, to the mutual displacement of the movable arms of the comparator including the transducer according to the invention, produces a variation in the reluctance of the magnetic circuits of windings 1 and 3. The consequent inductance variation of the two windings produces two different voltage values V1 and V3 and thus an unbalance voltage Vs other than zero, according to formula (2).

The displacement of core 8 also varies the mutual inductance between the primary windings altogether considered (1+3) and each of the secondary windings 2 and 4, differentially connected to each other. Therefore, because V2≠V4, unbalance voltage Vs' generated in the secondary windings differs from zero, according to formula (3).

The voltages V2 and V4 induced in the two secondary windings 2 and 4 by the overall primary winding 1+3 depend—at a specific position of core 8—on a coupling coefficient K. More particularly, making the simplified hypothesis that primary windings 1 and 3 are equal and symmetric with respect to each other, as well as the secondary windings 2 and 4, then $$V2 = K \cdot V1 \quad (6)$$

$$V4 = K \cdot V3 \quad (7)$$

with $$K = k \cdot n \quad (8)$$

where k varies depending on the transducer geometric features, and n is the turns ratio between secondary and primary windings: n=N2/N1.

The above hypothesis foresees the same k value in both the formulas (6) and (7) for the sake of simplification and making the substantial aspects of this invention clearer.

When the position of core 8 differs from the central symmetric one of FIG. 1, by substituting the formulas (2), (3), (6), (7) and (8) in (1), there results:

$$Vo = Vs(1 - 2 \cdot k \cdot N2/N1) \quad (9)$$

Thus, from formula (9) there results that output voltage Vo at terminal 7 has a value that, for displacements of core 8 of the same amount, varies among other things as the ratio of the turns varies n=N2/N1. As a consequence, contrary to what occurs in the known half bridge transducers, when the application requirements vary, the sensitivity can be set regardless of geometric considerations by choosing the appropriate turns ratio value n.

Figure 2A:
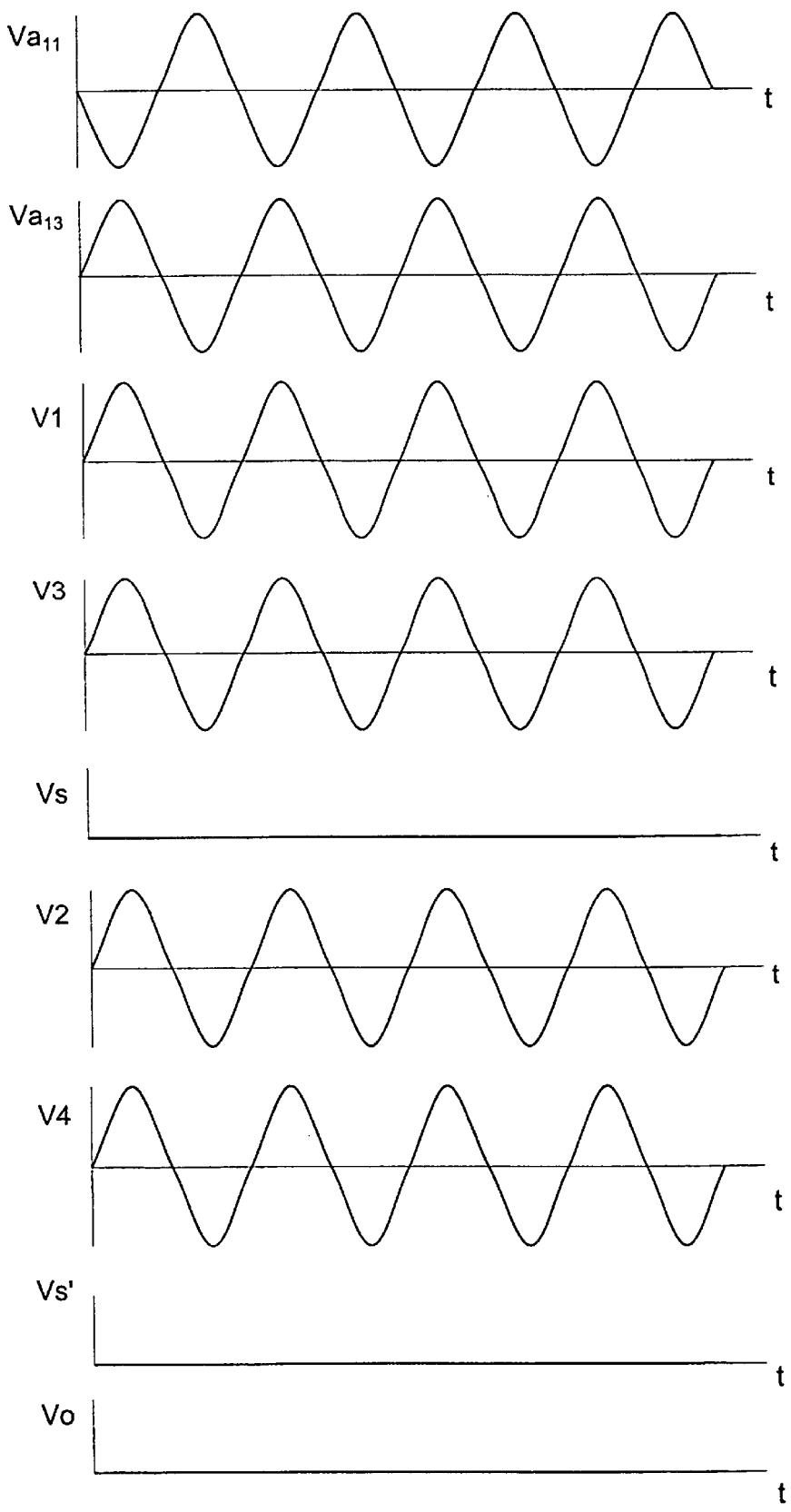
FIGS. 2a, 2b and 2c are graphs that show the trend of some of the voltages at various points of the circuit diagram of FIG. 1, taken at a plurality of mutual positions between the movable parts of the transducer.
Figure 2B:
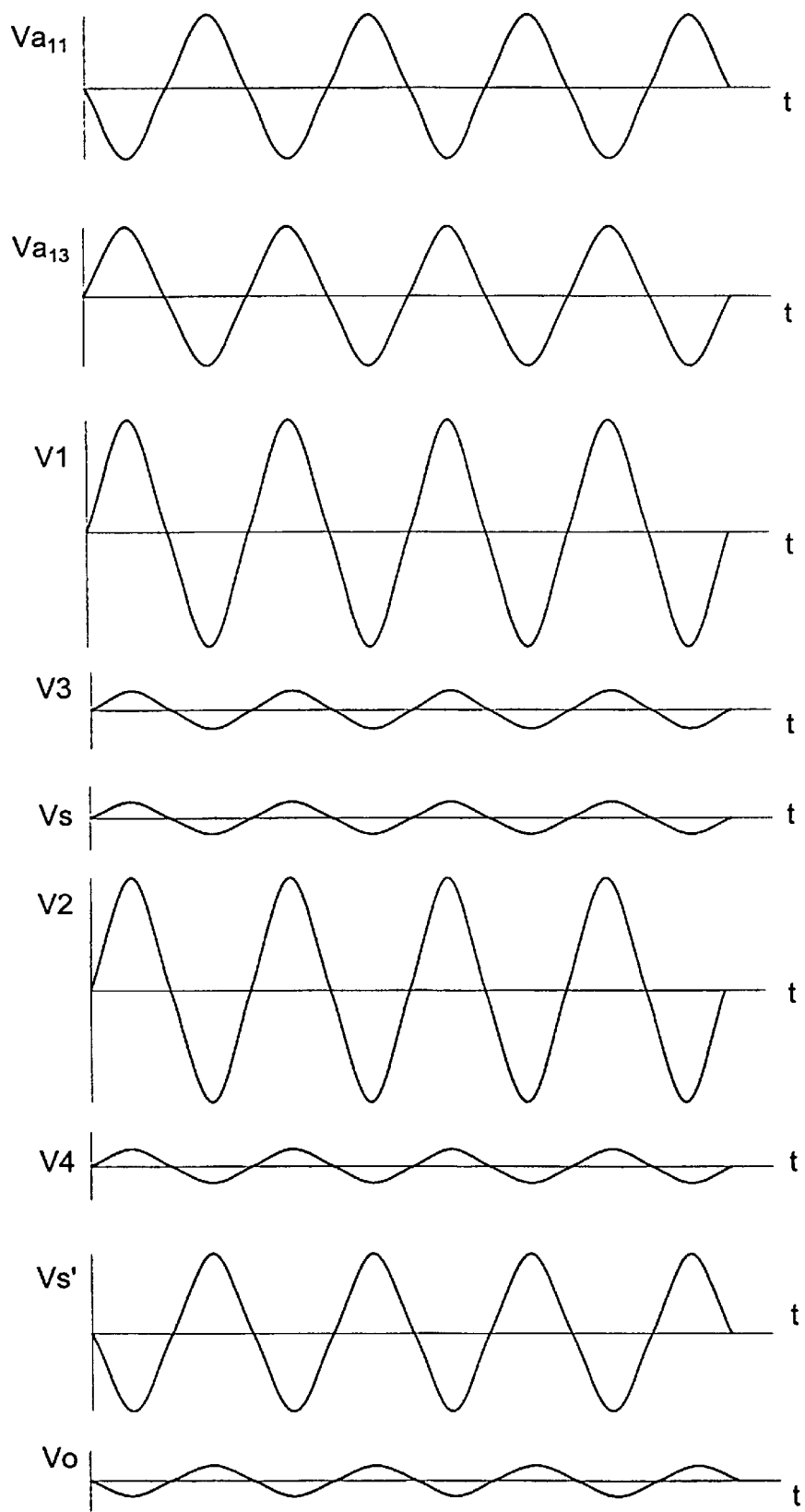
Figure 2C:
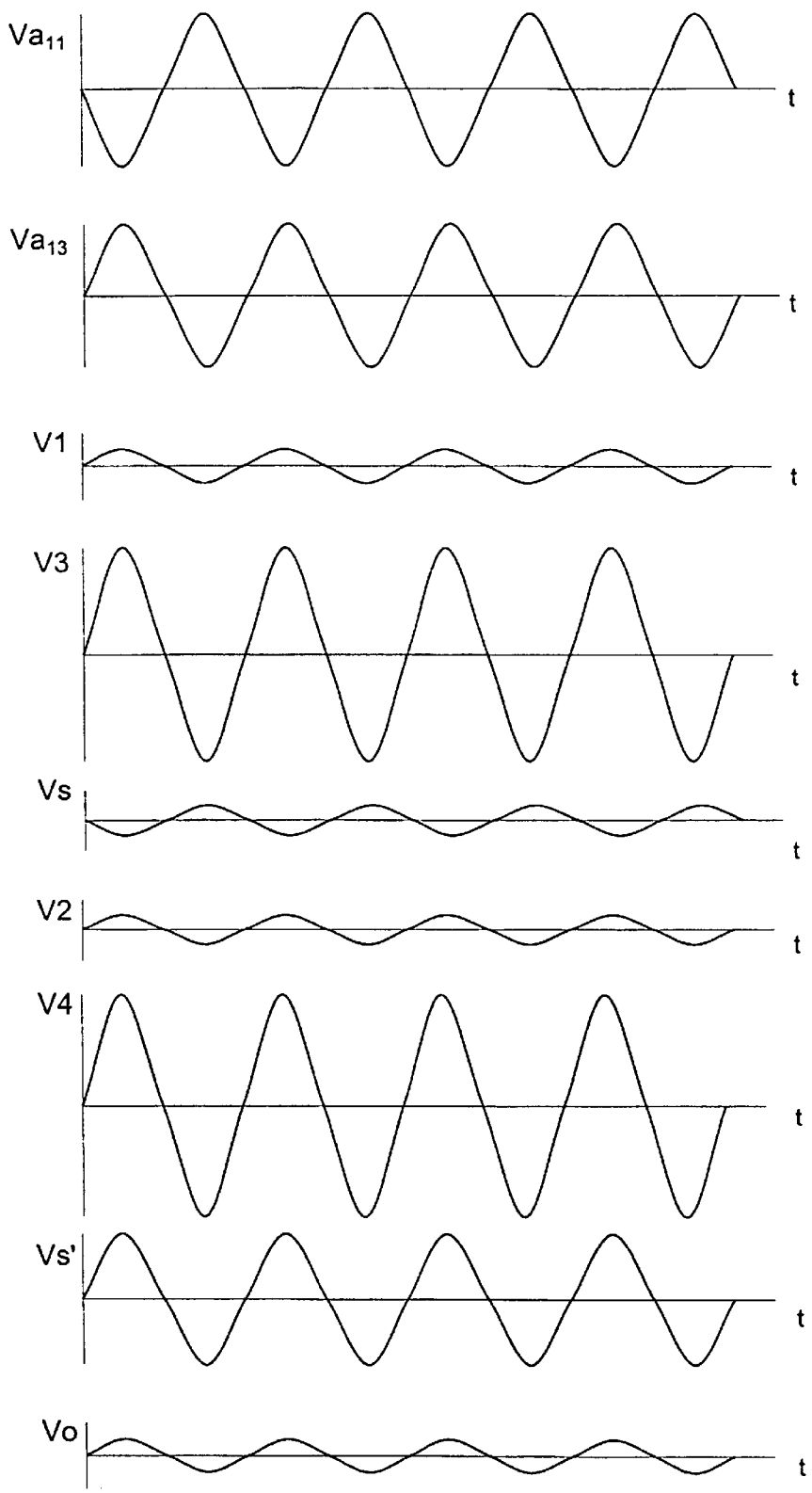

The FIGS. 2a, 2b and 2c show the trend of the voltages hereinbefore mentioned in response to the various positions of core 8. More specifically, FIG. 2a refers to the situation shown in FIG. 1 (core 8 is in a central and symmetric position) while FIGS. 2b and 2c refer to situations according to which core 8 is displaced along −X and +X, respectively.

The trends of output voltage Vo of FIGS. 2b and 2c show that, as the position of core 8 changes, the amplitude of the formerly mentioned voltage Vo varies, while the phase indicates the sense (−X or +X) of displacement of core 8 with respect to the central position of FIG. 1.

From the foregoing description and the FIG. 1 illustration, it appears that transducer T is connected to conditioning unit C by means of three conductors ending at terminals 5, 6 and 7, two being necessary for the power supply and one for the transmission of output signal Vo.

Another advantage of the transducer shown in FIG. 1 with respect to the known differential transformer transducers consists in the possibility of obtaining limited output impedance values. In fact, while the impedance value is determined, even in the arrangement shown in FIG. 1, by the sum of the impedances of the two secondary windings 2 and 4, in this case it is possible to choose a small number of turns N2 (and consequently low impedance values of the secondary windings 2 and 4) without causing—contrary to what occurs in the LVDTs—an unacceptable decrease in the transducer sensitivity. In fact, in the transducer according to the present invention, output signal Vo does not only depend on the transformer coupling, but, according to formula (1), it is the sum of two components. Thus, the choice of the appropriate turns ratio n (formula (9)) enables to achieve—in an extremely flexible way—the best possible balance among the required sensitivity and output impedance values.

According to an alternative to the herein illustrated and so far described embodiment, the primary windings 1 and 3 are energized with a single sinusoidal voltage between terminals 5 and 6, instead of the phase opposition voltages $Va_{11}$ and $Va_{13}$. In this case, voltage Vs—at the center position of core 8—has a known amplitude value that differs from zero (for example, equal to half that of the energizing voltage). With respect to the previously described embodiment, this alternative does not present substantial differences, apart from the phase of output voltage Vo, that does not enable to immediately distinguish displacements in one or in the other sense with respect to the central position of core 8.

Figure 3:
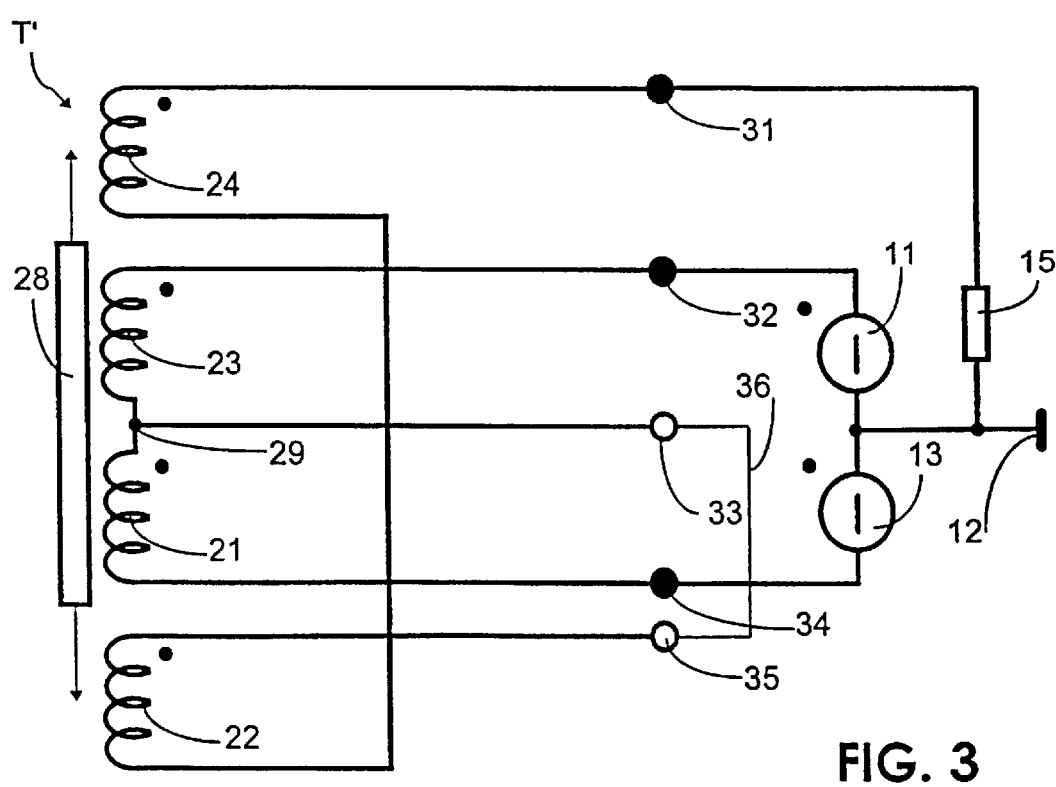
FIG. 3 is a circuit diagram of an inductive transducer according to a different embodiment of the invention and a first possible configuration.
Figure 4:
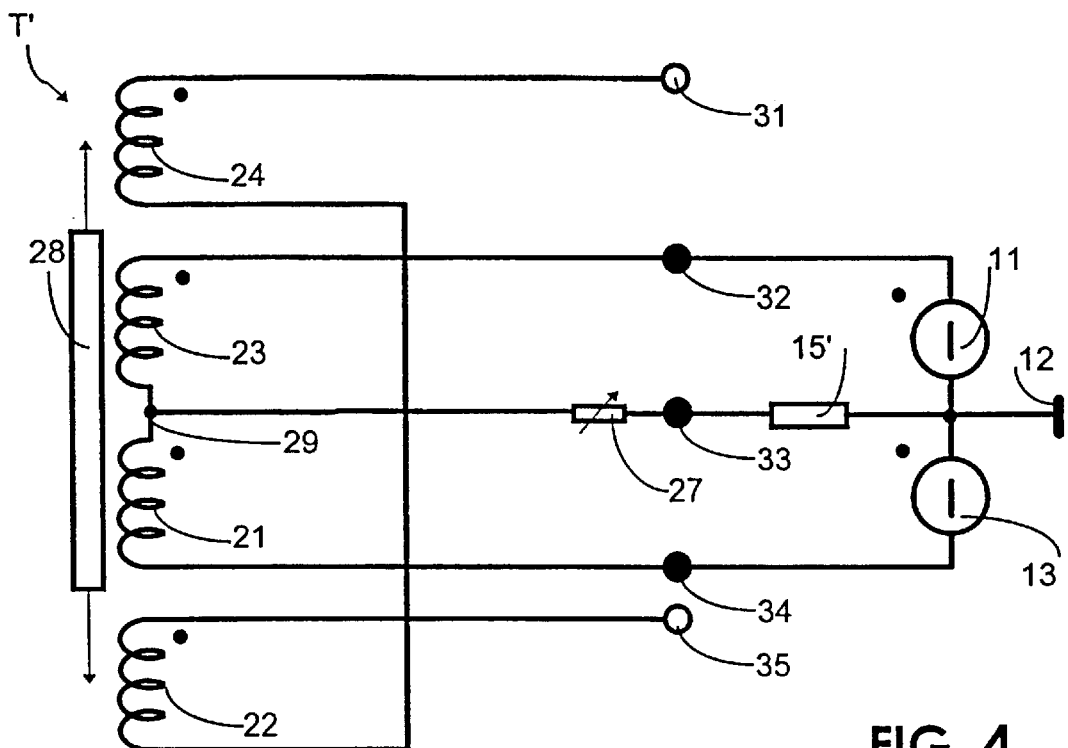
FIG. 4 is a circuit diagram of the transducer of FIG. 3, according to a second possible configuration.
Figure 5:
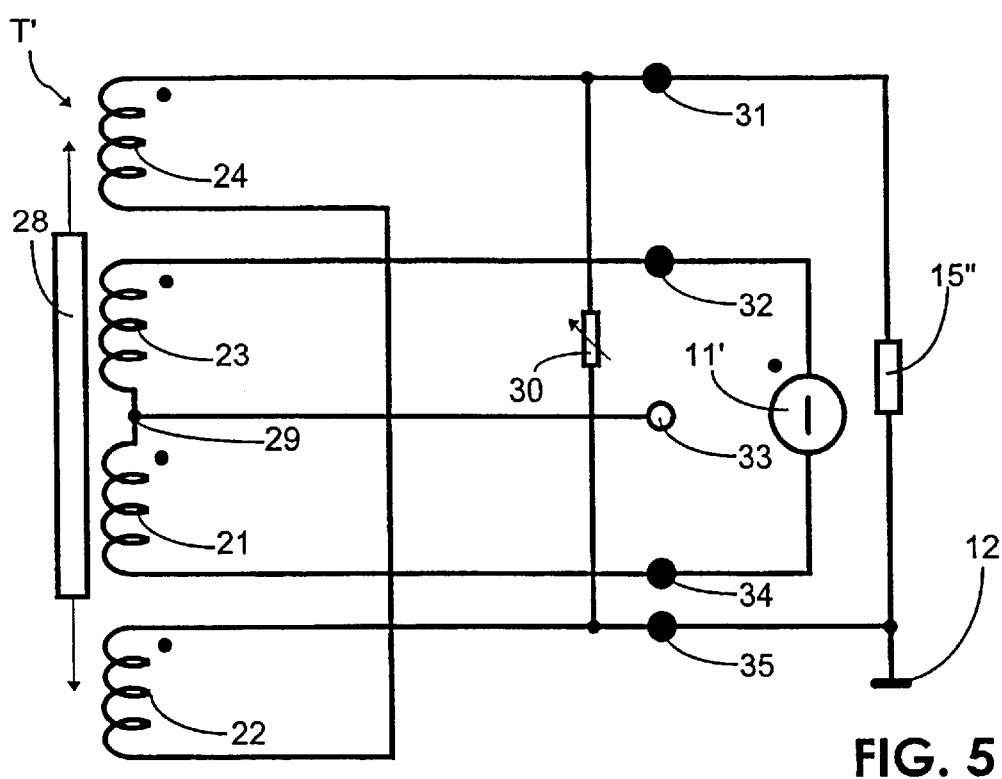
FIG. 5 is a circuit diagram of the transducer of FIG. 3, according to a third possible configuration.

The transducer T' shown in FIGS. 3, 4 and 5 includes first and second primary windings 21 and 23 connected in series at a connection point 29, first and second secondary windings 22 and 24, five terminals 31, 32, 33, 34 and 35 and a magnetic core 28 that can perform translation displacements with respect to windings 21–24.

In the configuration shown in FIG. 3, transducer T' is substantially similar to transducer T of FIG. 1. In fact, in this configuration, terminal 33 (that ends at connection point 29) and terminal 35 are short circuited, for example by means of a wire 36. The voltage generators 11 and 13 of the conditioning unit C, shown in FIG. 1, are connected to terminals 32 and 34, while output voltage Vo—substantially identical to the one attained with transducer T—is detected at the ends of load impedance 15 between terminal 31 and ground 12.

In the configuration shown in FIG. 4, secondary windings 22 and 24, ending at terminals 31 and 35, are not connected to external units and thus are insulated. By providing in this configuration, too, a connection between voltage generators 11 and 13 and terminals 32 and 34, it is possible to attain, by utilizing a suitable setting resistor 27, an output voltage Vo'—at the ends of a load impedance 15' between terminal 33 and ground 12—that varies as the position of core 28 changes, according to the well known functioning principle of a half bridge transducer or HBT.

Furthermore, in the configuration shown in FIG. 5, terminal 33 is insulated. A sinusoidal voltage generator 11' is connected to terminals 32 and 34 for feeding a primary winding 21+23 that consists of both windings 21 and 23, while an output voltage Vo" is detected, by utilizing a suitable setting resistor 30, at the ends of a load impedance 15" between terminals 31 and 35 (the latter being connected to ground 12). Voltage Vo" varies as the position of core 28 changes, according to the well known functioning principle of a linear variable differential transformer or LVDT.

From the concise description of FIGS. 3, 4 and 5, it appears that transducer T' is particularly flexible, since with a single structure it is possible to attain transducers of different types (LVDT, HBT or transducers of the new type described with reference to FIG. 1), and in each case achieve the type of transducer with the characteristics that best suit the specific application.

It is also to be noted that the setting resistors 27 and 30 are connected, respectively, to terminal 33 (insulated in the configuration of FIG. 5) and between terminals 31 and 35 (insulated in the configuration of FIG. 4). This enables to independently set the sensitivity for the HBT configuration (shown in FIG. 4) and LVDT configuration (shown in FIG. 5) on the same transducer T' and directly choose the proper configuration in the application phase, without the need of a further setting.

Transducers that include modifications with respect to what is herein schematically illustrated and so far described, for example in connection with the relative phases of the voltages at the ends of the different windings, also fall within the scope of this invention. In particular, by inverting the phase of the secondary windings (2 and 4 shown in FIG. 1) with respect to that of the primary windings (1 and 3), formula (2) changes to Vs=(V1−V3)/2 and, as a consequence, formula (9) changes to Vo=Vs (1+2·k·N2/N1). Thus, this alternative choice enables to attain a higher sensitivity.

As previously discussed with reference to the known transducers (of the LVDT or the HBT type), the use of the linear inductive transducers in measuring and control devices and apparatuses is quite widespread and varied, and the comparator shown in the herein mentioned patent U.S. Pat. No. 4,386,467 represents just one of the many possible applications for transducers T and T' according to the present invention.

What is claimed is:
1. A linear inductive transducer comprising:
   electric windings including
      a first primary winding, and
      a pair of secondary windings,
   a magnetic core, for performing linear displacements relative to the electric windings,
   a pair of input terminals electrically connected to said first primary winding and adapted for being electrically connected to a power supply unit,
   at least one output terminal electrically connected to said electric windings, the transducer being adapted for providing, through the output terminal, an electric signal indicative of the mutual position between said electric windings and said magnetic core, wherein the electric windings include a second primary winding between said first primary winding and one of said input terminals, said first and second primary windings being electrically connected to each other and to said pair of secondary windings, said electric signal including a first and a second component, indicative of the mutual position between the magnetic core and said primary windings and said secondary windings, respectively.

2. The transducer according to claim 1, wherein said first primary winding and said second primary winding are mutually connected in series at a connection point, and said secondary windings are electrically connected to said connection point.

3. The transducer according to claim 2, wherein said first primary winding and said second primary winding are each adapted to provide a signal that is variable as the mutual position between said first primary winding or said second primary winding and said magnetic core varies, the first component of said electric signal being proportional to the difference between the signals provided by the first and second primary windings, respectively.

4. The transducer according to claim 3, wherein the secondary windings are mutually connected in phase opposition.

5. The transducer according to claim 4, wherein each of said secondary windings provides an induced signal that is variable as the mutual position between said electric windings and said magnetic core varies, the second component of the signal electric being proportional to the difference between said induced signals.

6. The transducer according to claim 1, wherein said first primary winding and said second primary winding have the same number of turns, and each of said secondary windings has the same number of turns as the other.

7. The transducer according to claim 1, wherein said power supply unit includes two sinusoidal voltage generators connected in phase opposition.

8. A linear inductive transducer comprising:
   electric windings including
      a first primary winding, and
      a pair of secondary windings,
   a magnetic core for performing linear displacements relative to the electric windings,
   a pair of input terminals electrically connected to said primary winding and adapted for being electrically connected to a power supply unit, and
   output terminals electrically connected to said electric windings, the transducer being adapted for providing at least one of said output terminals with an electric signal indicative of the mutual position between said electric windings and said magnetic core, wherein the electric windings include a second primary winding between said first primary winding and an input terminal of said pair, the first and second primary windings being mutually connected in series at a connection point, said output terminals including three output terminals electrically connected to the ends of said pair of secondary windings, and to said connection point between the primary windings, respectively, the transducer being adapted for selectively providing said electric signal at one or a pair of said three output terminals.

9. The transducer according to claim 8, wherein the secondary windings are mutually connected in phase opposition.

10. The transducer according to claim 8, wherein two of said three output terminals are adapted for being electrically connected to one another for achieving an electric connection between the primary windings and the secondary windings, the transducer being adapted for providing said electric signal at the other of said three output terminals.

11. The transducer according to claim 10, wherein said electric signal includes a first and a second component, indicative of the mutual position between the magnetic core and the primary windings and secondary windings respectively.

12. The transducer according to claim 8, wherein two of said three output terminals are adapted for being insulated, the transducer being adapted for providing said electric signal at the other of said three output terminals.

13. The transducer according to claim 8, wherein said power supply unit includes two sinusoidal voltage generators connected in phase opposition.

14. The transducer according to claim 8, wherein the output terminal connected to the connection point is adapted for being insulated, the transducer being adapted for providing said electric signal at the two output terminals at the ends of said pair of secondary windings.

* * * * *